(12) United States Patent
Tian et al.

(10) Patent No.: US 11,873,713 B2
(45) Date of Patent: Jan. 16, 2024

(54) OIL WELL MONITORING APPARATUS AND METHOD

(71) Applicant: Shandong Tiangong Petroleum Equipment Co., Ltd., Jining (CN)

(72) Inventors: Haifeng Tian, Jining (CN); Xinhua Li, Jining (CN); Jianlin Wang, Jining (CN)

(73) Assignee: Shandong Tiangong Petroleum Equipment Co., Ltd., Jining (CN)

( * ) Notice: Subject to any disclaimer, the term of this patent is extended or adjusted under 35 U.S.C. 154(b) by 189 days.

(21) Appl. No.: 17/004,198

(22) Filed: Aug. 27, 2020

(65) Prior Publication Data

US 2021/0062648 A1    Mar. 4, 2021

(30) Foreign Application Priority Data

Aug. 28, 2019    (CN) .......................... 201910802449.2

(51) Int. Cl.
*E21B 49/00*    (2006.01)
*E21B 21/00*    (2006.01)

(52) U.S. Cl.
CPC .......... *E21B 49/005* (2013.01); *E21B 21/002* (2013.01)

(58) Field of Classification Search
CPC ....... E21B 21/002; E21B 49/005; G01F 15/08
See application file for complete search history.

(56) References Cited

U.S. PATENT DOCUMENTS

| 2,800,085 | A | * | 7/1957 | Hansen | E21B 43/38 417/199.2 |
| 3,203,351 | A | * | 8/1965 | Gillis | F04B 47/00 417/57 |
| 4,429,581 | A | * | 2/1984 | Furmaga | E21B 47/10 73/195 |

(Continued)

FOREIGN PATENT DOCUMENTS

| CN | 106247000 A | 12/2016 |
| CN | 106706670 A | 5/2017 |

(Continued)

OTHER PUBLICATIONS

Office Action and Search Report issued in Chinese Patent Application No. 201910802449.2, electronically available dated Aug. 25, 2022, 21 pages, with partial English translation.

*Primary Examiner* — John Fitzgerald
(74) *Attorney, Agent, or Firm* — Armstrong Teasdale LLP (57) ABSTRACT

The present disclosure relates to an oil well monitoring apparatus and method. The oil well monitoring apparatus includes a mixed liquid inlet and a mixed liquid outlet of a mixed liquid of oil, gas, and water in a ground pipeline connected to a wellhead of an oil well, a gas-liquid separator, an inlet of which is connected to the mixed liquid inlet, and a liquid monitoring member, which is connected between a liquid outlet of the gas-liquid separator and the mixed liquid outlet, and a gas monitoring member, which is connected between a gas outlet of the gas-liquid separator and the mixed liquid outlet, and a data processing device, which is (Continued)

configured to calculate a liquid production amount of the oil well based on the liquid monitoring data and calculate a gas production amount of the oil well based on the gas monitoring data.

15 Claims, 7 Drawing Sheets

(56) References Cited

U.S. PATENT DOCUMENTS

| | | | | |
|---|---|---|---|---|
| 4,727,489 | A * | 2/1988 | Frazier | E21B 47/10 166/265 |
| 4,813,270 | A * | 3/1989 | Baillie | G01F 1/74 374/33 |
| 5,526,684 | A * | 6/1996 | Liu | B01D 19/0057 96/216 |
| 6,032,539 | A * | 3/2000 | Liu | G01F 15/08 73/861.04 |
| 7,661,302 | B2 * | 2/2010 | Gysling | G01F 1/7082 73/200 |
| 9,114,332 | B1 * | 8/2015 | Liu | B01D 19/0063 |
| 10,197,425 | B2 * | 2/2019 | Pathier | G01F 15/005 |
| 10,359,306 | B2 * | 7/2019 | Henry | G01F 1/84 |
| 11,319,800 | B2 * | 5/2022 | Tian | E21B 47/26 |
| 2007/0006640 | A1 * | 1/2007 | Gysling | G01F 15/08 73/861.04 |
| 2015/0185062 | A1 * | 7/2015 | Ahmad | G01F 15/08 73/861.04 |
| 2017/0219403 | A1 * | 8/2017 | Henry | G01F 15/185 |

FOREIGN PATENT DOCUMENTS

| | | |
|---|---|---|
| CN | 108331576 A | 7/2018 |
| CN | 108625848 A | 10/2018 |
| DE | 3609588 A1 * | 9/1987 |
| KR | 20100096258 A * | 9/2010 |
| RU | 2685441 C1 * | 4/2019 |
| WO | 2004102131 A1 | 11/2004 |

* cited by examiner

OIL WELL MONITORING APPARATUS AND METHOD

CROSS REFERENCE TO RELATED APPLICATIONS

This patent application claims the benefit and priority of Chinese Patent Application No. 201910802449.2 filed on Aug. 28, 2019, the disclosure of which is incorporated by reference herein in its entirety as part of the present application.

BACKGROUND

The present disclosure relates to the technical field of oil production monitoring, and more particularly to an oil well monitoring apparatus and an oil well monitoring method.

In the process of oil production, a ground oil extraction apparatus, such as an oil pumping unit, extracts a mixed liquid of oil, gas and water from the formation and transports it through a ground pipeline, such as transporting it to an oil storage tank for temporary storage. In order to transport safely, the pressure and temperature of the mixed liquid discharged from the wellhead need to be detected, and in order to determine a yield of the oil well, a metering device needs to be installed to meter the yield of the oil well.

In the related art, when metering the yield, the amount of liquid production of the oil well is usually metered. For example, devices such as a vortex flowmeter, an ultrasonic flowmeter, and a metal float flowmeter are installed in the pipeline, or an oil well weighing and metering device is used, wherein a load cell and the number of times of tipping of a tipping bucket are used to calculate the amount of liquid production of the oil well, or an effective stroke of intake liquid is collected, an oil well indicator diagram is drawn, and the amount of liquid production of the oil well is calculated according to the oil well indicator diagram. However, in the above-mentioned various metering methods, it is the amount of liquid that is substantially measured, and the gas content usually cannot be measured at the wellhead.

According to the fluid discharge characteristics of the oil well, during an upstroke, the liquid flows out stream by stream, and during a downstroke, there is substantially no liquid discharged, which results in large metering errors of the aforementioned devices such as the vortex flowmeter, the ultrasonic flowmeter, a turbine flowmeter, and the metal float flowmeter, thus making it impossible to meet the needs of on-site production of the oil field. When using the oil well weighing and metering device to meter, since the measurement is intermittent, such as once every three days, it results in a large error of the estimated amount of liquid production of the oil well; moreover, when abnormal conditions occur in the oil well, problems cannot be found in time. When using the oil well indicator diagram to calculate the amount of liquid production of the oil well, although the problem of large error of the amount of liquid production is solved, abnormal situations such as oil pipe leakage still cannot be determined; moreover, this metering method cannot be used for heavy oil wells and special wells.

BRIEF DESCRIPTION

In view of the technical problems existing in the related art, the present disclosure provides an oil well monitoring apparatus and an oil well monitoring method, which are used to obtain monitoring parameters of a mixed liquid of oil, gas, and water output from an oil well, meter production amounts of the gas and liquid output from the oil well, and find abnormalities in the oil well in time.

According to one aspect of the present disclosure, the present disclosure provides an oil well monitoring apparatus, which includes a mixed liquid inlet and a mixed liquid outlet of a mixed liquid of oil, gas, and water in a ground pipeline connected to a wellhead of an oil well, a gas-liquid separator, an inlet of which is connected to the mixed liquid inlet, and which is configured to separate gas and liquid phases of the mixed liquid, a liquid monitoring member, which is connected between a liquid outlet of the gas-liquid separator and the mixed liquid outlet, and which is configured to collect liquid monitoring data, a gas monitoring member, which is connected between a gas outlet of the gas-liquid separator and the mixed liquid outlet, and which is configured to collect gas monitoring data, and a data processing device, which is electrically connected to the liquid monitoring member and the gas monitoring member, and which is configured to calculate a liquid production amount of the oil well based on the liquid monitoring data and calculate a gas production amount of the oil well based on the gas monitoring data.

The liquid monitoring member may further include a one-way throttle valve that turns on and off a pipeline between a liquid inlet and a liquid outlet of the one-way throttle valve by moving a spool in a valve cavity, and a detection element configured to obtain the time when the one-way throttle valve is in an open state.

The detection element may be a first pressure sensor, which is provided on a pipeline between the liquid outlet of the gas-liquid separator and the liquid inlet of the one-way throttle valve, and which is configured to obtain a pressure signal of the liquid flowing to the one-way throttle valve to obtain the time when the one-way throttle valve is open according to the pressure signal.

The detection element may be a position detection element, correspondingly, the one-way throttle valve includes an indicator rod connected to the spool, and the position detection element is configured to obtain a position of the indicator rod and obtain the time when the one-way throttle valve is open according to the position of the indicator rod.

The position detection element may be a Hall sensor, a photoelectric sensor, a micro switch, a metal detector, or a pressure sensor.

The oil well monitoring apparatus may further include one or more of a temperature sensor, a second pressure sensor, a vibration detector, and a tamper proof detector provided on the one-way throttle valve.

The oil well monitoring apparatus may further include a water content detection member provided on a pipeline below the liquid outlet of the gas-liquid separator, wherein the data processing device is further configured to obtain water content data based on detection data of the water content detection member.

The oil well monitoring apparatus may further include a first gas branch and a second gas branch, wherein the first gas branch is connected to the gas outlet of the gas-liquid separator, the second gas branch is connected to a casing gas pipeline of the oil well, and the first gas branch is merged with the second gas branch before being connected to the gas monitoring member.

The oil well monitoring apparatus may further includes an agitator including a first part and a second part, wherein the first part of the agitator is located in the gas-liquid separator, the second part of the agitator is located in the casing gas pipeline of the oil well, and the second part of the agitator drives the first part of the agitator to rotate when propelled by oil well casing gas.

The first part of the agitator may be located at a lower part of the gas-liquid separator.

A gas-enabled pressure regulating device may be provided between the casing gas pipeline and the second part of the agitator for adjusting a propelling force on the second part of the agitator.

A gas sampling port may be provided on a pipeline after the first gas branch is merged with the second gas branch.

A switch may be provided on the first gas branch for turning on or off a gas passage leading to the gas monitoring member from the gas-liquid separator.

A switch may be provided on the second gas branch for turning on or off a gas passage leading to the gas monitoring member from the casing gas pipeline of the oil well.

The gas monitoring member may include a gas passage including an inlet and an outlet, an inlet pressure sensor provided at the inlet to obtain a pressure signal when gas enters the gas passage, and an outlet pressure sensor provided at the outlet to obtain a pressure signal when the gas exits the gas passage.

The data processing device may include a calculation module configured to at least calculate a liquid production amount based on the liquid monitoring data and parameters of an oil well pumping unit, and calculate a gas production amount based on the gas monitoring data, a data display module configured to display the monitoring data and/or calculation result data, and a data transmission module configured to transmit the monitoring data and/or calculation result data to a second device.

The data transmission module may be a wireless transmission unit, and the second device is a remote server, a host computer, or a storage device.

According to another aspect of the present disclosure, the present disclosure provides an oil well monitoring method, which includes separating gas and liquid phases of a mixed liquid of oil, gas, and water output from an oil well, detecting an opening time of a one-way throttle valve when the separated liquid flows through the one-way throttle valve, calculating a liquid production amount of the oil well at least in part based on the opening time of the one-way throttle valve, monitoring the separated gas, and calculating a gas production amount of the oil well based on gas monitoring data of the separated gas.

The oil well monitoring method may further include using a first gas branch to transport gas after gas-liquid separation, using a second gas branch to transport gas of a casing gas pipeline of the oil well, and using a gas monitoring member to obtain gas monitoring data of a combined gas of the two gas branches.

The oil well monitoring method may further include providing switches on the first gas branch and the second gas branch to enable the gas monitoring member to obtain individual monitoring data of the gas of the casing gas pipeline of the oil well and the gas after gas-liquid separation.

At the same time of gas-liquid phase separation, the mixed liquid of oil, gas, and water may be agitated by using the gas of the casing gas pipeline of the oil well as power.

A gas-enabled pressure regulating device may be used to adjust the intensity of agitating the mixed liquid of oil, gas, and water by using the gas of the casing gas pipeline of the oil well.

The oil well monitoring method may further include detecting the water content of the liquid after gas-liquid phase separation.

In the present disclosure, parameters of the pumping unit is used to calculate the liquid production amount, which improves the calculation accuracy of the liquid production amount of the oil well, simplifies the mathematical calculation model, and saves a lot of manpower and material resources; the liquid production amount of the oil well can be metered in real time, the metering accuracy is high, no human participation is required, and a high degree of automation is achieved; through a detected signal curve of the one-way throttle valve in the apparatus, it can be determined whether liquid is normally discharged from the oil well, and abnormalities in the oil well can be found in time; in addition to the calculation of the liquid production amount, the apparatus can also calculate the gas production amount, amount of the casing gas and water content; through the various sensors as provided, states such as temperature and pressure can be monitored, and an alarm can be promptly issued when a safety problem occurs.

BRIEF DESCRIPTION OF THE DRAWINGS

Hereinafter, example embodiments of the present disclosure will be described in further detail with reference to the accompanying drawings, in which.

DETAILED DESCRIPTION

In order that the technical solutions and advantages of the embodiments of the present disclosure will become clearer, technical solutions in the embodiments of the present disclosure will be described clearly and completely below in conjunction with the drawings in the embodiments of the present disclosure. Apparently, the described embodiments are some of the embodiments of the present disclosure, not all of them. All the other embodiments obtained by those skilled in the art based on the embodiments of the present disclosure without creative efforts will fall within the scope of protection of the present disclosure.

In the following detailed description, reference may be made to various drawings which constitute a part of the present application and which serve to explain specific embodiments of the present application. In the drawings, similar reference signs denote substantially similar components in different figures. The individual specific embodiments of the present application will be described in sufficient detail below to enable those of ordinary knowledge and skills in the art to carry out the technical solutions of the present application. It is understood that other embodiments may be utilized, or structural, logical or electrical changes may be made to the embodiments of the present application.

Figure 1:
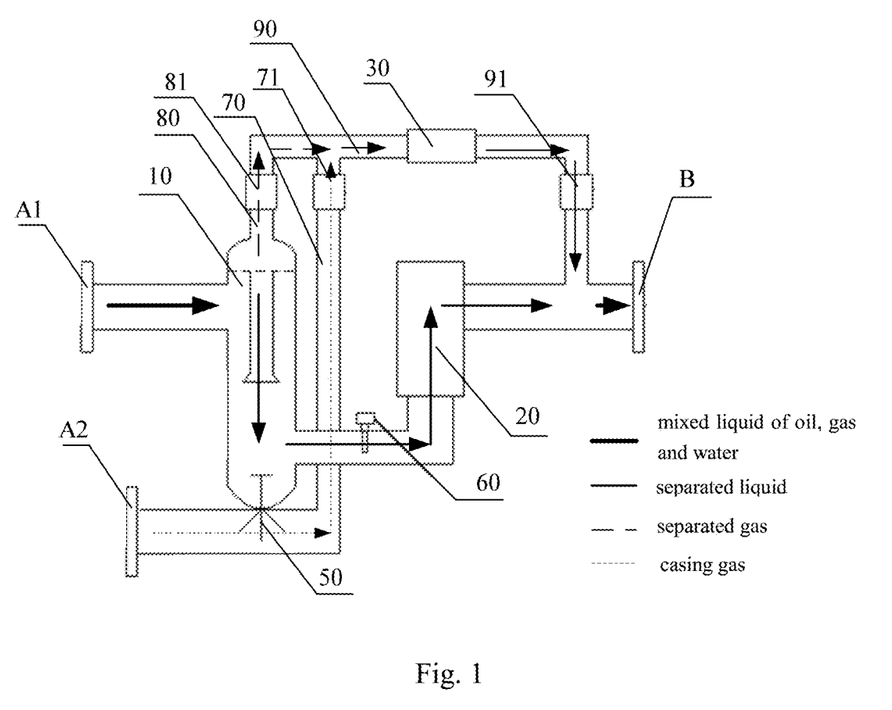
FIG. 1 is a simplified diagram illustrating the principle of an oil well monitoring apparatus according to an embodiment of the present disclosure.

FIG. 1 is a simplified diagram illustrating the principle of an oil well monitoring apparatus according to an embodiment of the present disclosure. In this embodiment, the apparatus includes a mixed liquid inlet A1 and a mixed liquid outlet B of a mixed liquid of oil, gas, and water in a ground pipeline connected to a wellhead of an oil well, a gas-liquid separator 10, a liquid monitoring member 20, a gas monitoring member 30, and a data processing device 40 (not shown). According to the substance transported in the pipeline, the pipeline is divided into a liquid pipeline and a gas pipeline. As shown in the figure, an inlet of the gas-liquid separator 10 is connected to the mixed liquid inlet A1 of the mixed liquid of oil, gas, and water for separating gas and liquid phases of the input mixed liquid. The separated liquid enters the liquid monitoring member 20 through the liquid pipeline. When the separated gas has a sufficient pressure, it passes through a gas one-way valve 81 on a first gas branch 80, enters a gas combined passage 90, and then flows through the gas monitoring member 30. The liquid monitoring member 20 is a one-way throttle valve assembly, which includes a one-way throttle valve and a detection element that detects an opening time of the one-way throttle valve. The separated liquid enters the one-way throttle valve through the liquid pipeline. When the pressure of the liquid entering the one-way throttle valve is high enough, the one-way throttle valve is opened, and the liquid flows through the one-way throttle valve. At the mixed liquid outlet B, the liquid merges with the gas in the gas combined passage 90 before flowing out to a ground pipeline. The detection element that detects the opening time of the one-way throttle valve sends a detected signal to the data processing device 40 for calculating the liquid production amount.

In this embodiment, an interface A2 for connecting to a casing gas pipeline of the oil well is also included. When the interface A2 is connected to the casing gas pipeline of the oil well, the casing gas of the oil well passes through a gas one-way valve 71 on a second gas branch 70, and merges with the separated gas in the gas combined passage 90 before flowing through the gas monitoring member 30. The gas flowing through the gas monitoring member 30 is introduced into the mixed liquid outlet B through a gas one-way valve 91, merges with the liquid and then flows out.

The data processing device 40 (not shown) calculates a liquid production amount of the oil well based on liquid monitoring data, and calculates a gas production amount of the oil well based on gas monitoring data.

In this embodiment, in order to better perform gas-liquid separation, the monitoring apparatus further includes an agitator. Since the metering of the casing gas of the oil well is added in this embodiment, the energy during flowing of the casing gas can be used for agitating. As shown in FIG. 1, an agitator 50 includes a first part and a second part. The first part of the agitator is located in the gas-liquid separator 10, and the second part of the agitator is located in the casing gas pipeline of the oil well. When the casing gas drives the second part of the agitator in the gas pipeline to rotate, the first part of the agitator in the gas-liquid separator also rotates therewith, so that the liquid phase and the gas phase are separated more thoroughly.

In this embodiment, a plug-in water content detection member 60 is provided in a liquid pipeline from the gas-liquid separator 10 to the liquid monitoring member 20 to detect a water content of the separated liquid in real time and send detection data to the data processing device 40, so that the data processing device 40 calculates water content data of the liquid in the liquid pipeline by using the detection data of the water content detection device. For example, the data processing device 40 obtains the data of the water content detection device 60 according to a collection frequency, and processes the data according to on-site application conditions to obtain more accurate water content data of the liquid.

Figure 2:
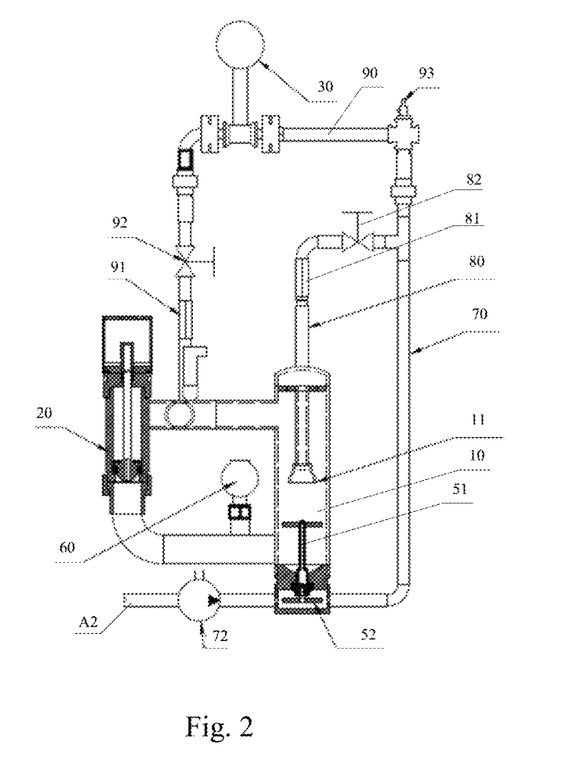
FIG. 2 is a schematic front structural diagram of an oil well monitoring apparatus according to an embodiment of the present disclosure.
Figure 3:
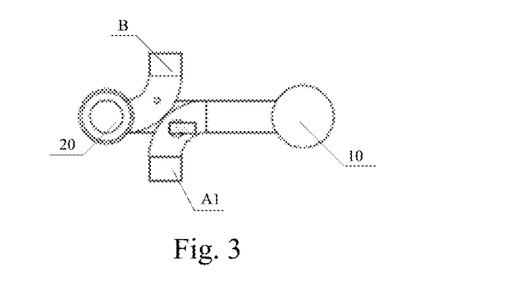
FIG. 3 is a top view of a part of the structure of FIG. 2.

FIG. 2 is a schematic front structural diagram of an oil well monitoring apparatus according to an embodiment of the present disclosure, and FIG. 3 is a top view of a part of the structure of FIG. 2. In this embodiment, an oscillating assembly 11 is provided inside the gas-liquid separator 10 and is composed of a straight cylinder and a bell mouth structure. The liquid outlet of the gas-liquid separator 10 is provided at a lower part of the separator, and the gas outlet is provided at the top of the separator. The bottom of the gas-liquid separator 10 and the casing gas pipeline of the oil well are connected by a metal rod. At the bottom of the gas-liquid separator and at the top of the metal rod, an agitating impeller 51 is installed, which is the first part of the agitator 50, and in the casing gas pipeline of the oil well, an impeller 52 is also installed at a top end of the metal rod, and the impeller 52 is the second part of the agitator 50. When the oil well casing gas flows, the impeller 52 is driven to rotate, and at the same time, the impeller 51 in the gas-liquid separator 10 is also driven to rotate to make full use of the energy during the flowing of the oil well casing gas. In order to increase a propelling force to the impeller 52, a pressure regulating device such as an air pump 72 shown in the figure is provided in the casing gas pipeline to adjust the propelling force to the impeller 52, so that the gas-liquid separation of the separator is more thorough.

In this embodiment, a switch 82 is provided on the first gas branch 80 for turning on or off a gas passage from the gas-liquid separator 10 to the gas monitoring member 20. When the switch 82 is closed, the gas monitoring member 20 only meters the gas in the second gas branch 70, that is, the casing gas is metered, thereby achieving the purpose of separately metering the oil well casing gas. Of course, a switch may also be provided on the second gas branch to realize separate metering of the gas in the mixed liquid of oil, gas, and water.

A gas sampling port 93 is provided in the gas combined passage 90 for conveniently sampling and analyzing the oil well gas. A one-way valve 91 and a switch 92 are also provided between the gas outlet of the gas monitoring member 30 and the mixed gas outlet B. When the gas pressure is sufficiently large, the gas passes through the one-way valve 91 to re-merge with the separated liquid; when the gas after gas-liquid separation does not need to follow the same pipeline as a combined liquid of oil and water, the switch 92 may be closed, so that the casing gas and the separated gas can enter the dedicated gas pipeline. Thus, the present disclosure provides multiple options for transporting the mixed liquid.

The liquid monitoring member 20 in this embodiment is a one-way throttle valve assembly, which includes a one-way throttle valve and a position detection element. An interior of a valve body of the one-way throttle valve is provided with an indicator rod connected to a spool, and the position detection element is configured to detect the position of the indicator rod, so that a change curve of the displacement of the spool over time can be obtained, and the time when the one-way throttle valve is open is obtained according to the curve.

Figure 4:
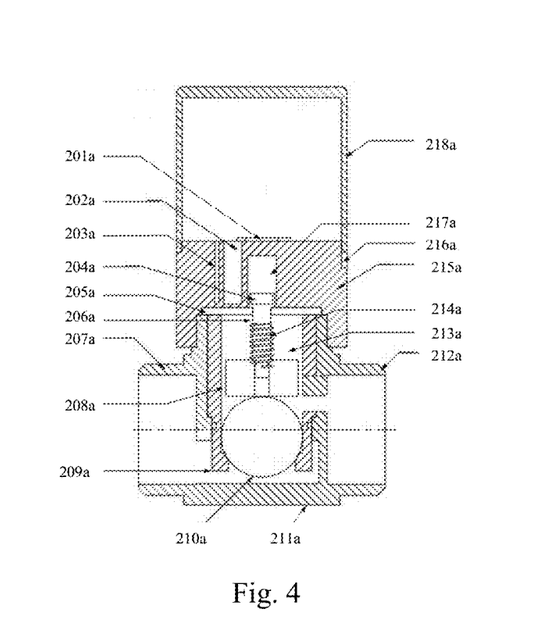
FIG. 4 is a structural diagram of a one-way throttle valve according to an embodiment of the present disclosure.

In one embodiment, as shown in FIG. 4, the one-way throttle valve assembly includes mechanical parts, and is provided with a liquid inlet 207a, a liquid outlet 212a, a spool 210a, a valve seat 209a, a valve body 211a, a valve cavity 213a, a rubber damping pad 208a, a spring 214a, an indicator rod 206a, a spool travel cavity 217a, a cover plate 205a, a base 215a, and a shroud 218a. The liquid inlet 207a and the liquid outlet 212a are connected together by the valve body 211a. The valve seat 209a is located inside the valve body 211a and connects the liquid inlet 207a and the liquid outlet 212a together. The valve seat 209a can be directly removed from the valve body 211a for replacement. The spool 210a is located on an upper part of the valve seat 209a, can move up and down inside the valve cavity 213a so as to contact the valve seat 209a for sealing, and can be removed from the valve seat 209a for replacement. The rubber damping pad 208a is located on an upper part of the spool 210a and is in contact with the spool 210a. The indicator rod 206a is located on an upper part of the rubber damping pad 208a, and the two are connected together. The indicator rod 206a passes through the spring 214a and the cover plate 205a sequentially and enters the spool travel cavity 217a. The spool 210a, the rubber damping pad 208a, the spring 214a, and the indicator rod 206a are located in the valve cavity 213a, the cover plate 205a is located above the valve seat 215a and contacts the base 215a, and the shroud 218a is provided on an upper part of the base 215a.

In this embodiment, the position detection element uses a Hall sensor to detect the movement of the spool 210a. A magnet 204a is installed at the top of the indicator rod 206a. The magnet 204a cannot pass through the cover plate 205a, and can move freely up and down in the spool travel cavity 217a. The Hall sensor is installed in a detection hole 202a for adjusting the distance between the Hall sensor and the magnet 204a. The Hall sensor is fixed on a metal rod. When adjusting the position, only the position of the metal rod needs to be moved up and down. The spool travel cavity 217a is in communication with the valve cavity 213a and the pressures thereof are kept the same. After the spool 210a moves upward, the Hall sensor sends a sensed signal to the data processing device 40. When the data processing device 40 receives the sensed signal, it activates an internal timer to time the duration of the signal. When the spool 210a moves upward, the liquid flows into the valve cavity 213a, and flows into the oil pipeline through the liquid outlet 212a. When the pressure at the bottom of the spool 210a is lower than the pressure at the upper part of the spool 210a, under the action of the spring 214a, the spool 210a is pressed down to the valve seat 209a, so that the spool 210a and the valve seat 209a are sealed to prevent liquid from flowing back into the liquid inlet 207a from the liquid outlet 212a of the one-way throttle valve. When the spool 210a moves downward and the Hall sensor cannot detect the signal, the data processing device 40 stops the internal timer, and the time period in which the one-way throttle valve is open can be obtained by calculating the duration of the signal.

In addition to the Hall sensor in this embodiment, the position detection element may also use a metal detector, a micro switch, a photoelectric switch, an electronic ruler, a strain gauge, or a pressure sensor to detect the opening time of the one-way throttle valve.

For example, when the position detection element uses an electronic ruler or a strain gauge, the electronic ruler or the strain gauge is connected to the indicator rod 206a, and when the indicator rod 206a moves with the spool 210a, a mechanical displacement of the spool is converted into a corresponding electrical signal. Therefore, the position of the spool can be determined based on the electrical signal. The opening time of the one-way throttle valve can be determined through the change of the position of the spool 210 over time.

When the position detection element uses a metal detector to detect the position of the spool, the metal detector can be directly installed at a suitable position in the internal cavity of the one-way throttle valve, such as at the top of the travel cavity 217a. When the spool moves upward, the indicator rod is driven to move upward, and the indicator rod 206a moves upward to approach the metal detector. After the metal detector detects the indicator rod 206a, it sends a switch signal to the data processing device 40. After receiving the switch signal, the data processing device 40 activates the internal timer to start timing, so that the movement of the spool 210a can be known through the switch signal.

When a photoelectric switch is used to detect the position of the spool 210a, the photoelectric switch adopts a "U"-shaped structure and can be installed at the top of the spool travel cavity 217a. When the indicator rod 206a moves upward to block the light, the photoelectric switch gives a switch signal and sends it to the data processing device 40. After receiving the switch signal, the data processing device 40 activates the internal timer to start timing, so that the movement of the spool 210a can be known through the switch signal, and the time period in which the one-way throttle valve is open is further obtained.

When a pressure sensor is used to detect the position of the spool 210a, the pressure sensor is installed on an upper part of the indicator rod 206a and contacts the indicator rod 206a through a matching spring 214a. When the spool 210a moves upward, the indicator rod 206a moves upward therewith and compresses the spring 214a. The force of the spring 214a is fed back to a force receiving surface of the pressure sensor. The pressure sensor sends a signal to the data processing device 40, the data processing device 40 can determine the movement of the indicator rod, and the time period in which the one-way throttle valve is open is further obtained.

When a micro switch is used, the micro switch can be installed at the top of the spool travel cavity 217a, and a stopper can be installed at the top end of the indicator rod 206a. When the spool 210a moves upward, the indicator rod 206a moves upward therewith. When the stopper touches the micro switch, it sends a switch signal to the data processing device 40. The data processing device 40 can know the movement of the spool 210a through the switch signal, and the time period in which the one-way throttle valve is open is further obtained.

In order to obtain more monitoring data, the one-way throttle valve in this embodiment is also installed with various sensors. For example, referring to FIG. 4, a detection hole 203a for installing a temperature sensor, a fixing hole 201a for installing a second pressure sensor, a fixing hole for installing a vibration sensor (not shown), and an installing hole 216a for installing a tamper proof detector are provided in the base 215a. The temperature sensor such as a thermocouple and a thermistor is configured to obtain the temperature of the liquid flowing into the one-way throttle valve. The second pressure sensor may be a pressure sensor of strain type, piezoresistive type, capacitive type, piezoelectric type, vibrating type, photoelectric type, optical fiber type, ultrasonic type, etc., which converts the pressure of the liquid in the one-way throttle valve into an electrical signal so as to determine the liquid pressure in the one-way throttle valve. The vibration sensor may be a single-axis or multi-axis acceleration sensor, which is configured to sense the vibration of the one-way throttle valve, so that the data processing device 40 determines whether an abnormality occurs in the one-way throttle valve according to an internal preset safe vibration range of the one-way throttle valve. The tamper proof detector is for example a micro switch, a limit switch, a Hall sensor, etc. When a protective shroud is normally installed, the tamper proof detector outputs a high-level signal, and when the protective shroud is artificially damaged or stolen, the tamper proof detector outputs a low-level signal. The data processing device 40 can determine whether an abnormality occurs in the one-way throttle valve based on the signal.

In some embodiments, the detection data of the first pressure sensor, the second pressure sensor, the vibration sensor, and the temperature sensor can be used in combination to reflect the working state of the one-way throttle valve more accurately.

Figure 5:
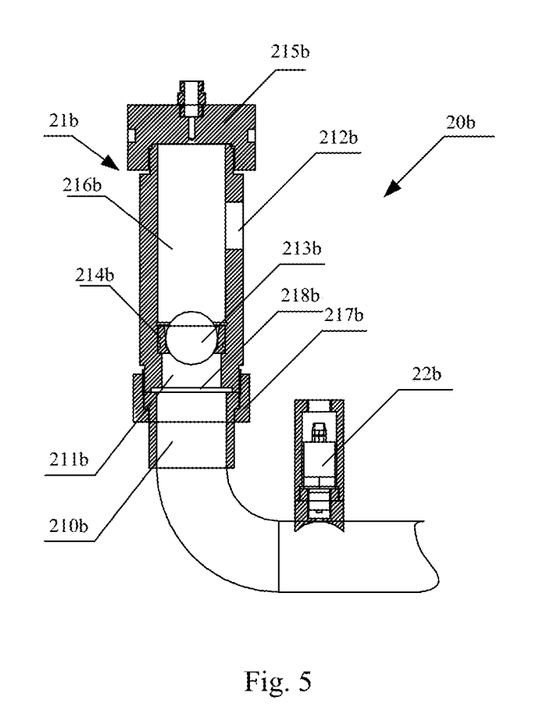
FIG. 5 is a structural diagram of a liquid monitoring member according to another embodiment of the present disclosure.

FIG. 5 is a structural diagram of a liquid monitoring member 20b according to another embodiment of the present disclosure. In the present embodiment, the liquid monitoring member 20b includes a one-way throttle valve 21b and a first pressure sensor 22b. The liquid outlet of the gas-liquid separator 10 is connected to a liquid inlet 211b of the one-way throttle valve 21b through a pipeline and a connecting bolt 217b, and a liquid flowing out of the gas-liquid separator 10 after separation is transported to the one-way throttle valve 21b. A seal 218b is installed at the connection position. A valve cavity 216b of the one-way throttle valve 21b is provided therein with a spool 213b and a valve seat 214b. The spool may also be referred to as a valve ball. When the pressure of the liquid entering the one-way throttle valve 21b is sufficiently large, the spool 213b is ejected, and the liquid enters the valve cavity 216b and then flows out of the liquid outlet 212b. The first pressure sensor 22b is disposed on a pipeline between the liquid outlet of the gas-liquid separator 10 and the liquid inlet of the one-way throttle valve 21b, and is configured to obtain a pressure signal of the liquid flowing to the one-way throttle valve 21b. The data processing device 40 can obtain the opening time of the one-way throttle valve 21b according to the collected liquid pressure signal.

In addition, in order to obtain more monitoring data, such as the liquid temperature and the state of the one-way throttle valve, the one-way throttle valve 21b may also be provided with a temperature sensor, a second pressure sensor, a vibration sensor, and a tamper proof detector, which will not be described repeated herein.

Figure 6:
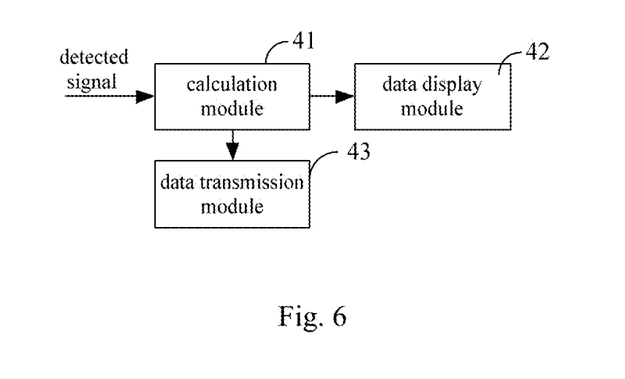
FIG. 6 is a block diagram illustrating the principle of a data processing device according to an embodiment of the present disclosure.

FIG. 6 is a block diagram illustrating the principle of a data processing device according to an embodiment of the present disclosure. The data processing device 40 includes a calculation module 41, a data display module 42, and a data transmission module 43, wherein the calculation module 41 is a circuit using industrial control machines such as a single-chip machine and a programmable controller as main components.

Figure 7:
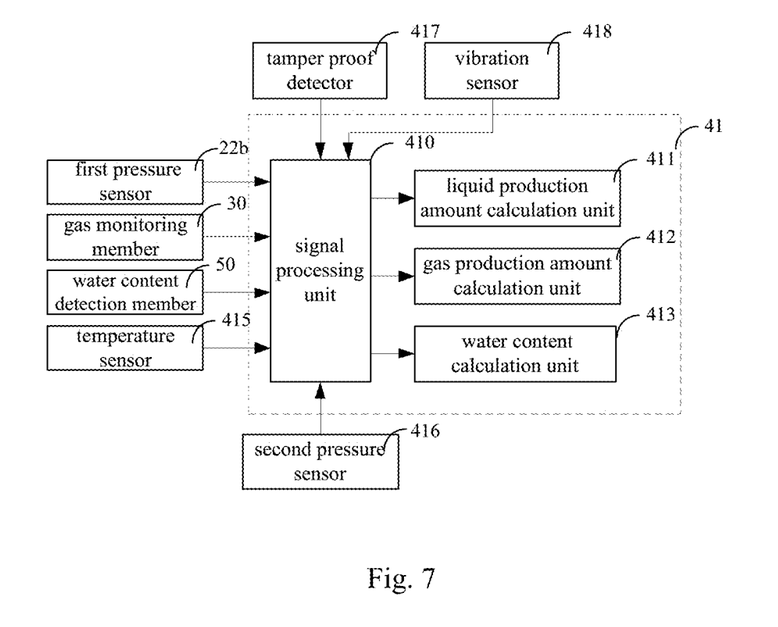
FIG. 7 is a block diagram illustrating the principle of a calculation module according to an embodiment of the present disclosure.

Reference is made to FIG. 7, which is a block diagram illustrating the principle of a calculation module according to an embodiment of the present disclosure. The calculation module 41 mainly includes a signal processing unit 410, a liquid production amount calculation unit 411, a gas production amount calculation unit 412, and a water content calculation unit 413. The signal processing unit 410 performs related processing according to different types of signals received, and then sends them to other computing units or modules.

Figure 8:
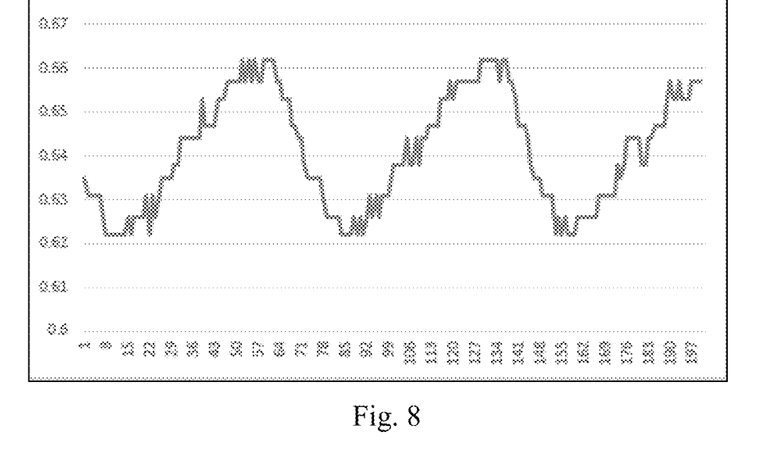
FIG. 8 is a pressure signal diagram according to an embodiment of the present disclosure.
Figure 9:
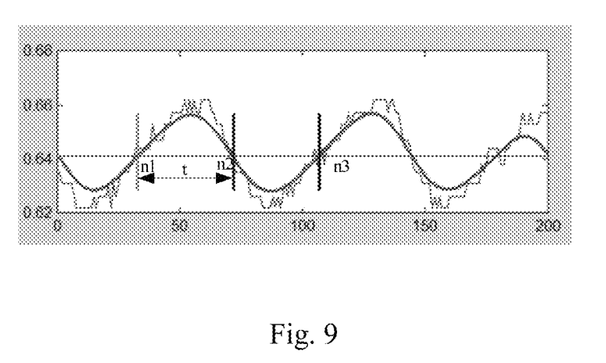
FIG. 9 is a schematic signal diagram after processing the pressure signal diagram shown in FIG. 8.

For example, the first pressure sensor 22b collects a pipeline pressure signal according to a set collection period, and sends the pipeline pressure signal to the signal processing unit 410. The signal processing unit 410 draws a pressure signal diagram according to the pipeline pressure signal, as shown in FIG. 8, wherein the horizontal axis represents the sampling number, and the vertical axis represents the pressure value. The signal processing unit 410 performs further processing on the pressure signal, such as signal smoothing processing, and calculates an average pressure value, as shown in FIG. 9, wherein a smooth sine curve is a pressure signal curve obtained by smoothing according to the original pressure signal curve, the straight line corresponding to 0.64 is the average pressure value, and the intersection points n1 and n3 between the sine curve and the average-value straight line define one data period. From this graph, it can be known that between n1 and n2, the pipeline pressure value is greater than the average value, so the time period between n1 and n2 is confirmed as the opening time t of the one-way throttle valve in the upstroke of the oil well.

Figure 10:
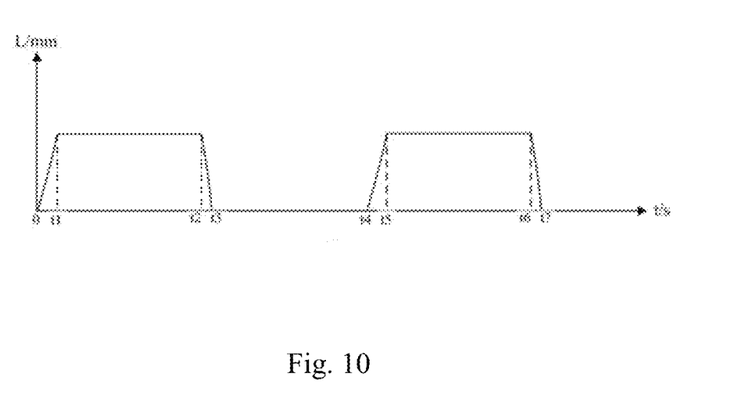
FIG. 10 is a displacement-time curve graph according to an embodiment of the present disclosure.

Alternatively, when a Hall sensor is used as the position detection element, a displacement-time curve of the spool 210a is drawn according to the sensed signal, wherein the horizontal axis represents time, and the vertical axis represents the sensed displacement of the spool 210a. As shown in FIG. 10, the opening time t=t2−t1 of the one-way throttle valve can be obtained according to the displacement-time curve.

The liquid production amount calculation unit 411 uses the following formula (1-1) to calculate an upstroke liquid production amount in one pumping unit cycle according to parameters of the pumping unit and the currently obtained opening time t of the one-way throttle valve.

$$Q(i) = \frac{\pi D^2 Lt}{2T} \times B0 \times 10^{-6} \qquad \text{formula (1-1)}$$

wherein Q(i) is the liquid production amount in the upstroke of the $i^{th}$ pumping unit cycle, with the unit being $m^3$;

D is a pump diameter of the pumping unit, with the unit being mm;

L is the stroke of the pumping unit, with the unit being m;

t is the time in which the spool moves upward in the $i^{th}$ upstroke, with the unit being s;

T is the pumping unit cycle, with the unit being s; and

B0 is a volume ratio of oil and gas.

The liquid production amount of the oil well calculated by formula (1-1) is lower than actually measured liquid production amount. This is because a part of the liquid that overflows due to a pumping rod entering the mixed fluid of the oil well is not calculated, so when calculating the liquid production amount of the oil well according to the one-way throttle valve, the liquid production amount needs to be corrected. The correction amount is calculated according to formula (1-2), specifically as follows:

$$Q_{correction}(i) = \frac{\pi d^2 Lt}{2T} \times B0 \times 10^{-6} \quad \text{formula (1-2)}$$

wherein $Q_{correction}(i)$ is a corrected liquid production amount in a downstroke of the $i^{th}$ pumping unit cycle, with the unit being $m^3$;

d is the diameter of the pumping rod, with the unit being mm;

L is the stroke of the pumping unit, with the unit being m;

t is the time in which the spool moves upward in the $i^{th}$ downstroke of the pumping unit, with the unit being s;

T is the pumping unit cycle, with the unit being s; and

B0 is a volume ratio of oil and gas.

By combining formula (1-1) with formula (1-2), a formula (1-3) for calculating a corrected liquid production amount in one pumping unit cycle is obtained:

$$Q(i) = \frac{\pi L B0}{2T} \times (D^2 t_{1i} + d^2 t_{2i}) \times 10^{-6} \quad \text{formula (1-3)}$$

wherein $Q(i)$ is the liquid production amount in the $i^{th}$ pumping unit cycle, with the unit being $m^3$;

D is a pump diameter of the pumping unit, with the unit being mm;

d is the diameter of the pumping rod, with the unit being mm;

L is the stroke of the pumping unit, with the unit being m;

T is the pumping unit cycle, with the unit being s;

B0 is a volume ratio of oil and gas;

$t_{1i}$ is the time in which the spool moves upward in the upstroke of the $i^{th}$ pumping unit cycle, with the unit being s; and $t_{2i}$ is the time in which the spool moves upward in the downstroke of the $i^{th}$ pumping unit cycle, with the unit being s.

Based on formula (1-3), a corrected daily liquid production amount of the oil well correction can be calculated by formula (1-4):

$$Q = \sum_{i=1}^{i=M} Q(i) \quad \text{formula (1-4)}$$

wherein Q is the daily liquid production amount of the pumping unit, with the unit being $m^3$;

Q(i) is the liquid production amount of the pumping unit in the $i^{th}$ cycle, with the unit being $m^3$; and M is the number of cycles of the pumping unit in one day.

The liquid production amount calculation unit 411 may store the data obtained by calculation in a storage module, or display the data in the data display module according to set parameters, or send the data to a host computer when communicating with the host computer, according to a request from the host computer or according to a communication protocol with the host computer, or send a calculation result, original collected data and the like to a server or an external storage device through the data transmission module such as a wireless transmission unit, according to a corresponding wireless communication protocol.

Likewise, the gas monitoring member 30 and the water content detection member 50 send the data detected by them to the data processing device 40. Through the signal processing of the signal processing unit 410, relevant data are sent to the gas production amount calculation unit 412, and the water content calculation unit 413 respectively. The gas production amount and the water content are calculated by the gas production amount calculation unit 412 and the water content calculation unit 413. In some embodiments, the gas monitoring member 30 may adopt a structure of a conventional gas flowmeter such as a vortex flowmeter, an ultrasonic flowmeter, a turbine flowmeter, and a metal float flowmeter. When a conventional gas flowmeter is used, since the conventional gas flowmeter has a gas flow rate calculation unit, the gas production amount calculation unit 412 of the present disclosure is equivalent to the calculation unit in these flowmeters.

Figure 11:
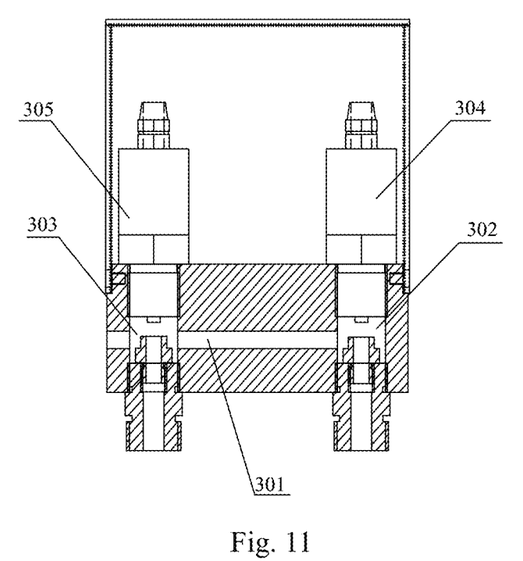
FIG. 11 is a schematic structural diagram of a gas monitoring member provided by an embodiment of the present disclosure.

In another embodiment, as shown in FIG. 11, a schematic structural diagram of a gas monitoring member provided by an embodiment of the present disclosure is illustrated. In this embodiment, the gas monitoring member includes a gas passage 301, an inlet 302 and an outlet 303, and an inlet pressure sensor 304 and an outlet pressure sensor 305 are installed at the inlet 302 and the outlet 303 respectively. When gas enters the gas passage 301 from the inlet 302, the inlet pressure sensor 304 can sense the gas pressure. When the gas passes through the gas passage 301 and flows out of the outlet 303, the outlet pressure sensor 305 can sense the gas pressure and send a sensed signal to the data processing device 40. After a processing by the signal processing unit 410, the gas production amount calculation unit 412 can calculate an instantaneous gas amount based on the signals sensed by the two pressure sensors and physical parameters of the gas passage 301. An accumulative amount of gas can then be calculated based on a time parameter.

The water content detection member may be a plug-in water content detection member. The water content detection member may detect the liquid in the pipeline by means of microwave, capacitance, resistance, or high-frequency radio frequency induced electric field. For example, according to the principle that a transmission speed of microwave is affected by the propagation medium, when the frequency of the microwave is fixed, the faster the speed is, the shorter the wavelength will be. In case of the same transmission distance, the phase shift of the microwave in the air is greater than that of oil, and even greater than that of water, so the water content can be detected by detecting a change in the phase shift. For example, Chinese Patent Publication No. CN106706670A discloses an example of detecting water content, and the entire content of the patent is incorporated into the present patent.

The signal processing unit 410 further receives signals from the temperature sensor 415, the second pressure sensor 416, the tamper proof detector 417, and the vibration sensor 418. Electrical signals sent from the temperature sensor 415 and the second pressure sensor 416 are respectively processed into corresponding temperature information and pressure information, and are stored or displayed. In one embodiment, the temperature information/pressure information is further compared with a preset safety threshold, and an alarm message is issued when the detected temperature/ pressure exceeds the preset safety threshold. The vibration sensor 418 senses vibration of the one-way throttle valve, and the signal processing unit 410 determines whether the vibration of the one-way throttle valve is abnormal according to an internal preset safe vibration range. If the data detected by the vibration sensor 418 exceeds the safe range, it can be determined that the current one-way throttle valve is abnormal, and an alarm message is issued. Further, an alarm cause can be added to the alarm message. For example, code 01 indicates an alarm caused by temperature, and code 02 indicates an alarm caused by pressure, etc. The signal processing unit 410 determines whether the protective shroud of the one-way throttle valve is damaged according to the signal sent from the tamper proof detector 417, and if it is damaged, an alarm message is issued. In some embodiments, the temperature sensor 415, the first pressure sensor 22*b*, the second pressure sensor 416 and the vibration sensor 418 can be used in combination to more accurately reflect the working state of the one-way throttle valve. For example, the combined use of the temperature sensor 415, the second pressure sensor 416 and the vibration sensor can indicate a failure caused by a closing fault of the one-way throttle valve (code 05).

The data display module 42 may use various displays, display screens or digital tubes to display monitoring data and calculation result data, and may also display alarm message and codes.

The data transmission module 43 sends monitoring data and/or calculation result data to a second device. The second device may be a host computer, a remote server, or an external storage device. In some embodiments, the data transmission module 43 may use a wireless transmission unit, such as ZigBee, 433 MHz, Wifi, LoRa, NB-IoT, and other means for wireless transmission. After receiving the monitoring data, the host computer or remote server triggers a corresponding device according to the monitoring data. For example, when receiving the alarm message, a sound and light alarm device is triggered according to the content of the alarm message, or different colors are displayed on the display screen so as to prompt relevant staff to take action.

Figure 12:
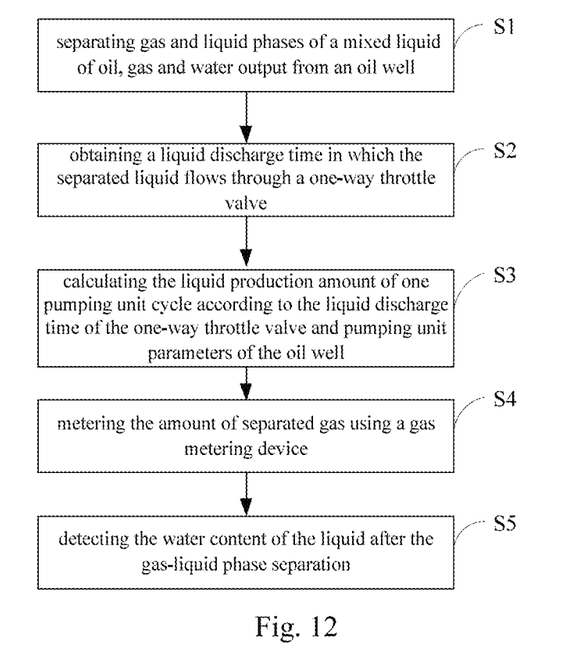
FIG. 12 is a flowchart of an oil well monitoring method according to an embodiment of the present disclosure.

FIG. 12 is a flowchart of an oil well monitoring method according to an embodiment of the present disclosure, which includes the following steps S1 to S4:

Step S1: separating gas and liquid phases of a mixed liquid of oil, gas, and water output from an oil well. As shown in FIG. 1, a gas-liquid separator may be used for the separation. The gas-liquid separator may use a cyclone separator with a spiral structure inside, or may use an oscillating assembly composed of a straight cylinder and a bell mouth structure (as shown in FIG. 2). In order to increase the separation effect, an agitator can also be provided in the gas-liquid separator. In one embodiment, when metering the oil well casing gas, the energy generated by the flow of the oil well casing gas is used to propel the agitator, as shown using the structure shown in FIGS. 1 and 2. In order to obtain a better result, a pressure regulating device such as an air pump may also be added to increase the propelling force to the agitator.

Step S2: obtaining a liquid discharge time in which the separated liquid flows through a one-way throttle valve. As shown in FIG. 4 and FIG. 5, a detection element that cooperates with the one-way throttle valve is used to detect the liquid discharge time of the one-way throttle valve, for example, to detect the time when the spool moves upward, or detect the duration of the pressure that moves the spool upward.

Step S3: calculating the liquid production amount of one pumping unit cycle according to the liquid discharge time of the one-way throttle valve and pumping unit parameters of the oil well. The calculation process is specifically the same as the foregoing calculation process of the liquid production amount calculation unit 411, and details are not described herein again.

Step S4: metering the amount of separated gas using a gas monitoring member. In one embodiment, the oil well casing gas may also be metered. Specifically, two gas branches are used to transport different gases respectively, as shown in FIGS. 1 and 2, wherein a first gas branch is used to transport the gas after gas-liquid separation, and a second gas branch is used to transport the gas in the casing gas pipeline of the oil well. A switch is provided on the first gas branch, so that the gas monitoring member can meter the combined gas amount of the two gas branches, and can also close the switch on the first gas branch to meter the oil well casing gas separately.

In one embodiment, step S5 is further included to detect the water content of the liquid after the gas-liquid phase separation. As shown in FIG. 2, by providing a plug-in water content detection member on the pipeline from the separator to the one-way throttle valve assembly, the water content of the produced liquid of the oil well can also be measured.

In other embodiments, more monitoring data can be obtained based on various sensors installed in the apparatus. For example, the temperature of the liquid flowing into the one-way throttle valve is obtained through the temperature sensor installed in the one-way throttle valve, the pressure of the liquid received by the one-way throttle valve is obtained through the second pressure sensor in the one-way throttle valve, whether the protective shroud of the one-way throttle valve is intact is determined through the tamper proof detector, and the vibration condition of the one-way throttle valve is obtained through the vibration sensor, etc. Through a comprehensive judgment of the above various monitoring data, various possible failures can be judged, and the alarm can be issued promptly.

In specific applications, according to actual on-site requirements, or for ease of installation, various units in the data processing device 40 may be distributed in different structures of the apparatus. For example, a processing part of the liquid monitoring data of the signal processing unit 410, the liquid production amount calculation unit 411, and the one-way throttle valve assembly are combined into one device, a processing part of the gas monitoring data of the signal processing unit 410, the gas production amount calculation unit 412, and the gas monitoring member are combined into one device, and a processing part of the water content monitoring data of the signal processing unit 410, the water content calculation unit 413, and the water content detection member are combined into one device. These devices, as slave devices, are connected to a master device through communication cables, such as an RS485 communication cables. The master device controls the work of slave devices and data collection, and is connected to a host computer and/or a server for outputting data to the host computer or modifying parameters and control processes according to instructions from the host computer/server.

Figure 13:
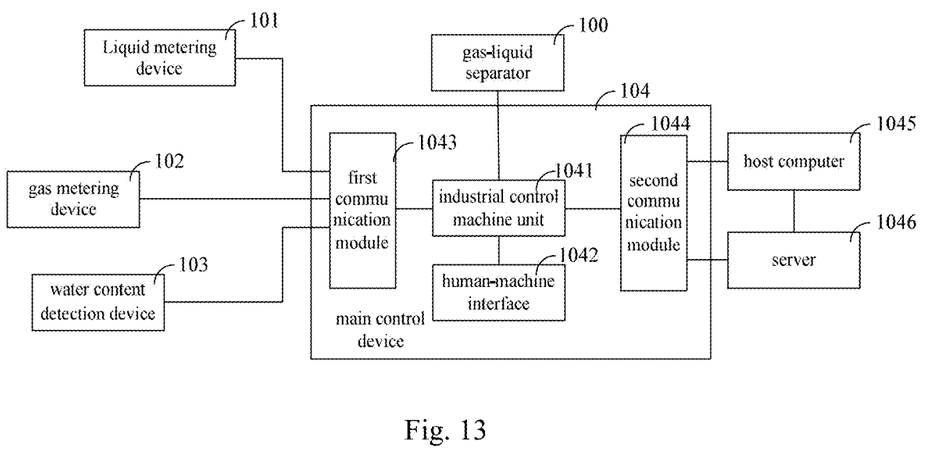
FIG. 13 is a structural block diagram of an oil well monitoring apparatus according to an embodiment of the present disclosure.

FIG. 13 is a structural block diagram of an oil well monitoring apparatus according to an embodiment of the present disclosure. Specifically, the oil well monitoring apparatus includes a gas-liquid separator 100, a liquid metering device 101, a gas metering device 102, a water content detection device 103, and a main control device 104. The liquid metering device 101, the gas metering device 102, and the water content detection device 103 are connected to the main control device 104 through communication cables, respectively. An inlet of the gas-liquid separator 100 is connected to an inlet of a mixed liquid of oil, gas, and water of a ground pipeline, and is used for gas-liquid phase separation of the input mixed liquid. The specific structure may adopt the structure shown in FIG. 2. The gas-liquid separator 100 may be electrically connected to the main control device 104 and configured to receive control instructions from the main control device 104 and work, such as start/stop instructions. The liquid metering device 101 is connected in series between the liquid outlet of the gas-liquid separator 100 and the mixed liquid outlet, and is configured to collect liquid monitoring data and calculate the liquid production amount based on the liquid monitoring data. The liquid metering device 101 includes a one-way throttle valve assembly as shown in FIG. 2 or FIG. 4, a detection element, and a data module. The detection element sends a detected signal to the data module. The data module can use an industrial control machine such as a single-chip machine as the main control chip to process data, and can display the calculation result in a display (such as a digital tube, a liquid crystal display, etc.). The data module sends the result or the data required by the main control device 104 to the main control device 104 through a RS485 communication cable according to a protocol with the main control device 104. The gas metering device 102 is connected in series between the gas outlet of the gas-liquid separator 100 and the mixed liquid outlet, and is configured to collect gas monitoring data and calculate a gas amount based on the gas monitoring data. For example, it may be a conventional gas flowmeter such as a vortex flowmeter, an ultrasonic flowmeter, and a metal float flowmeter, or the structure shown in FIG. 10 may also be used as the gas monitoring member, and a data module corresponding thereto may be included. When the data module calculates the gas amount, the result or the data required by the main control device 104 is sent to the main control device 104 through the RS485 communication cable according to the protocol with the main control device 104. The water content detection device 103 is inserted into the liquid pipeline from the gas-liquid separator 100 to the liquid metering device 101 to obtain the water content of the separated liquid, and sends the water content to the main control device 104 through the RS485 communication cable.

The main control device 104, as the main electrical device of the apparatus, mainly includes an industrial control machine unit 1041, a human-machine interface 1042, and a communication module. The communication module includes a first communication module 1043 connected to the slave device, such as an RS485R communication module, and a second communication module 1044a connected to a host computer 1045/a server 1046. The second communication module 1044 may be a wired communication module, such as RS232, RS485, or a wireless communication module, e.g., ZigBee, 433 MHz, Wifi, LoRa, NB-IoT modules and the like.

The industrial control machine in the industrial control machine unit 1041 may be a single-chip machine or a programmable controller (PLC). The human-machine interface 1042 may be a touch screen for inputting and/or setting parameters, and it may also display data.

Figure 14:
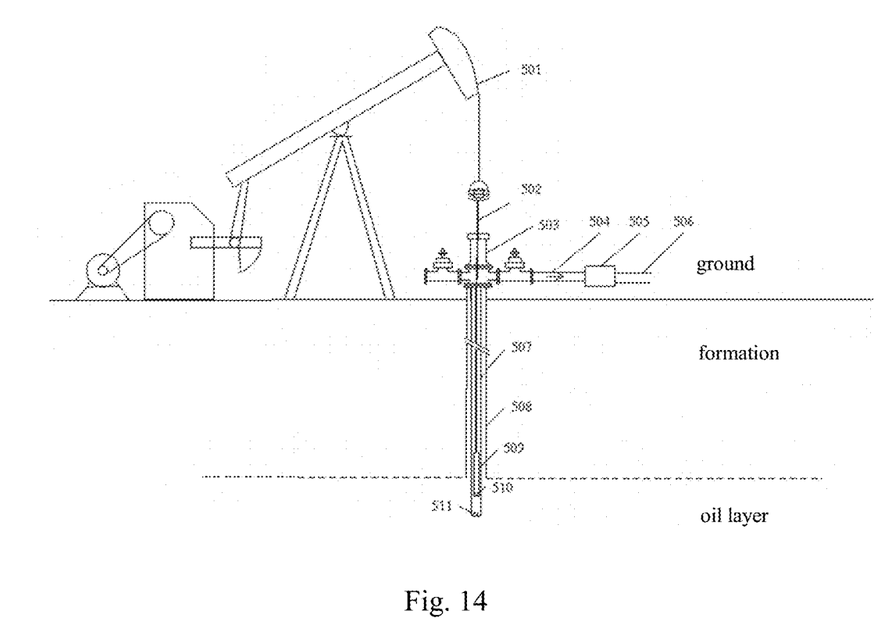
FIG. 14 is a structural diagram illustrating an application of a monitoring apparatus according to an embodiment of the present disclosure.

FIG. 14 is a structural diagram illustrating an application of a monitoring apparatus according to an embodiment of the present disclosure. As shown in FIG. 14, during the operation of a pumping unit 501, the pumping unit 501 is connected to an oil pump 509 in the oil layer through a pumping rod 502 so as to drive the oil pump 509 to reciprocate up and down in the formation and the oil layer. The liquid drawn from the oil layer enters the monitoring apparatus 505 provided by this embodiment through a formation oil pipe 507, a Christmas tree 503, and a ground oil pipe 504. After the liquid production amount of the oil well is monitored and metered through the monitoring apparatus 505, the liquid enters an oil transport pipeline 506 of the oil field.

The specific working process is when the oil pump 509 moves upward, a traveling valve 510 is closed by the pressure of the liquid column above the oil pump 509 in the formation oil pipe 507, and the liquid above the oil pump 509 gradually enters the ground oil pipe 504 and flows to the monitoring apparatus 505 as the oil pump moves upward continuously. Since the oil pump 509 moves upward, the pressure in the ground oil pipe 507 increases continuously, and finally the spool in the monitoring apparatus 505 is lifted. When the liquid flows through the monitoring apparatus 505, the opening time of the one-way throttle valve can be obtained by detecting the position of the spool or a change of the pressure in the pipeline.

A fixed valve 511 is lifted by the pressure of the liquid column in an annular space of the formation oil pipe 507 and the casing 508 due to the pressure drop in a pump cylinder of the oil pump 509, and the liquid in the oil well enters the pump cylinder of the oil pump 509, filling the space formed by the upward movement of the oil pump 509.

When the oil pump 509 moves downward, the pressure in the oil pump 509 is increased since the liquid column in the pump cylinder of the oil pump 509 is pressed, and the fixed valve 511 is closed. When the oil pump 509 continues to moves downward, the pressure in the oil pump 509 continues to increase. When the pressure in the pump cylinder of the oil pump 509 exceeds the pressure of the liquid column in the formation oil pipe 507, the swimming valve 510 is opened, and the liquid enters the formation oil pipe 507 from the interior of the oil pump 509. As the liquid enters, the pressure in the formation oil pipe 507 increases continuously, a part of the liquid also enters the ground oil pipe 504 and lifts the spool of the monitoring apparatus 505, and the liquid flows through the monitoring apparatus 505. The monitoring apparatus 505 can calculate the liquid production amount by using the foregoing formulas according to the time when the one-way throttle valve is open and parameters of the pumping unit.

During the upward movement of the oil pump 509, the liquid in the oil layer is pumped to the ground oil pipe 507. During the downward movement, the pumping rod enters the mixed liquid of the oil well and causes a part of the mixed liquid to overflow, thereby lifting the spool of the monitoring apparatus 505. A small part of the liquid flows through the monitoring apparatus 505. The liquid in the oil layer enters the oil pump 509, the oil pump 509 starts to move upward, and such a cycle occurs repeatedly. The working cycle of the monitoring apparatus 505 is consistent with the oil pump 509. When the oil pump 509 moves upward, the liquid in the formation oil pipe 507 enters the Christmas tree 503 and the ground oil pipe 507 and flows to the monitoring apparatus 505 to lift the spool of the monitoring apparatus 505. When the oil pump 509 moves downward, a part of the overflow liquid caused by the pumping rod lifts the spool of the monitoring apparatus 505, and a small amount of liquid is discharged. According to the time when the spool is lifted, the apparatus can calculate the proportion of the time when the spool is lifted in the oil well cycle. Based on this proportion, the travel of the liquid discharge from the oil pump 509 can be calculated. According to parameters such as the pump diameter, travel, crude oil density, the diameter of pumping rod and the like of the oil pump 509, the actual liquid production amount of the oil well can be calculated.

This embodiment combines the one-way throttle valve and the oil pump 509. According to a running trajectory of the oil pump 509 and the liquid discharge time measured by the one-way throttle valve, a new calculation method for calculating the liquid production amount of the oil well is provided. The oil pump 509 is a direct mechanism for pumping liquid in the oil layer. The liquid production amount of the oil well is directly calculated through the oil pump 509, which greatly improves the calculation accuracy of the liquid production amount of the oil well, simplifies the mathematical calculation model, and saves a lot of manpower and material resources. The liquid production amount of the oil well is metered in real time, the metering accuracy is higher and more precise, no human participation is required, and a high degree of automation is achieved. According to the method for calculating the liquid production amount provided in this embodiment, it is also possible to determine whether the oil well is normally discharging liquid according to the detected signal curve of the one-way throttle valve. In this embodiment, in addition to the calculation of the liquid production amount, the monitoring apparatus can also calculate the gas production amount, the casing gas amount, and the water content of the liquid. Various sensors can be provided to monitor the states such as the temperature and pressure, and an alarm can be promptly issued when a safety problem occurs.

The above embodiments are only for the purpose of illustrating the present disclosure, rather than limiting the present disclosure. Those skilled in the relevant technical field may make various changes and modifications without departing from the scope of the present disclosure. Therefore, all the equivalent technical solutions should also fall within the scope of the present disclosure.

What is claimed is:

1. An oil well monitoring apparatus comprising:
   a mixed liquid inlet and a mixed liquid outlet of a mixed liquid of oil, gas, and water in a ground pipeline connected to a wellhead of an oil well;
   a gas-liquid separator, an inlet of which is connected to the mixed liquid inlet, and which is configured to separate gas and liquid phases of the mixed liquid;
   a liquid monitoring member, which is connected between a liquid outlet of the gas-liquid separator and the mixed liquid outlet, and which is configured to collect liquid monitoring data, wherein the liquid monitoring member comprises:
   a one-way throttle valve that turns on and off a pipeline between a liquid inlet and a liquid outlet of the one-way throttle valve by moving a spool in a valve cavity; and
   a detection element configured to detect a signal indicating that the one-way throttle valve is in an open state;
   a gas monitoring member, which is connected between a gas outlet of the gas-liquid separator and the mixed liquid outlet, and which is configured to collect gas monitoring data;
   a data processing device electrically connected to the liquid monitoring member and the gas monitoring member, wherein based on the signal detected by the detection element, the data processing device is configured to obtain a time period when the one-way throttle valve is in an open state, and wherein the data processing device is configured to calculate a liquid production amount of the oil well based on the liquid monitoring data and calculate a gas production amount of the oil well based on the gas monitoring data;
   a first gas branch, wherein the first gas branch is connected to the gas outlet of the gas-liquid separator; and
   a second gas branch, wherein the second gas branch is connected to a casing gas pipeline of the oil well, and wherein the first gas branch is merged with the second gas branch before being connected to the gas monitoring member.

2. The oil well monitoring apparatus according to claim 1, further comprising a water content detection member provided on a pipeline below the liquid outlet of the gas-liquid separator, wherein the data processing device is further configured to obtain water content data based on detection data of the water content detection member.

3. The oil well monitoring apparatus according to claim 1, wherein the gas monitoring member comprises:
   a gas passage comprising an inlet and an outlet;
   an inlet pressure sensor provided at the inlet to obtain a pressure signal when gas enters the gas passage; and
   an outlet pressure sensor provided at the outlet to obtain a pressure signal when the gas exits the gas passage.

4. The oil well monitoring apparatus according to claim 1, wherein the data processing device comprises:
   a calculation module configured to at least calculate the liquid production amount based on the liquid monitoring data and parameters of an oil well pumping unit, and calculate the gas production amount based on the gas monitoring data;
   a data display module configured to display the liquid monitoring data, the gas monitoring data, and calculation result data; and
   a data transmission module configured to transmit the liquid monitoring data, the gas monitoring data, and the calculation result data to another device.

5. The oil well monitoring apparatus according to claim 4, wherein the data transmission module is a wireless transmission unit, and wherein the another device is a remote server, a host computer, or a storage device.

6. The oil well monitoring apparatus according to claim 1, wherein the detection element is a first pressure sensor, which is provided on a pipeline between the liquid outlet of the gas-liquid separator and the liquid inlet of the one-way throttle valve, and which is configured to obtain a pressure signal of liquid flowing to the one-way throttle valve, wherein the pressure signal indicates that the one-way throttle valve is open.

7. The oil well monitoring apparatus according to claim 6, further comprising one or more of a temperature sensor, a second pressure sensor, a vibration detector, and a tamper proof detector provided on the one-way throttle valve.

8. The oil well monitoring apparatus according to claim 1, wherein the detection element is a position detection element, correspondingly, the one-way throttle valve comprises an indicator rod connected to the spool, and the position detection element is configured to obtain a position of the indicator rod, wherein the position indicates that the one-way throttle valve is open.

9. The oil well monitoring apparatus according to claim 8, wherein the position detection element is a Hall sensor, a photoelectric sensor, a micro switch, a metal detector, or a pressure sensor.

10. The oil well monitoring apparatus according to claim 1, further comprising an agitator comprising a first part and a second part, wherein the first part of the agitator is located in the gas-liquid separator, wherein the second part of the agitator is located in the casing gas pipeline of the oil well, and wherein the second part of the agitator drives the first part of the agitator to rotate when propelled by oil well casing gas.

11. The oil well monitoring apparatus according to claim 10, wherein the first part of the agitator is located at a lower part of the gas-liquid separator.

12. The oil well monitoring apparatus according to claim 10, wherein a switch is provided on the second gas branch for turning on or off a gas passage leading to the gas monitoring member from the casing gas pipeline of the oil well.

13. The oil well monitoring apparatus according to claim 10, wherein a pressure regulating device is provided between the casing gas pipeline and the second part of the agitator for adjusting a propelling force on the second part of the agitator.

14. The oil well monitoring apparatus according to claim 13, wherein a gas sampling port is provided on a pipeline after the first gas branch is merged with the second gas branch.

15. The oil well monitoring apparatus according to claim 13, wherein a switch is provided on the first gas branch for turning on or off a gas passage leading to the gas monitoring member from the gas-liquid separator.

* * * * *